(12) United States Patent
Glebe (10) Patent No.: US 9,767,817 B2
(45) Date of Patent: Sep. 19, 2017

(54) ADAPTIVELY FILTERING A MICROPHONE SIGNAL RESPONSIVE TO VIBRATION SENSED IN A USER'S FACE WHILE SPEAKING

(75) Inventor: Dag Glebe, Södra Sandby (SE)

(73) Assignees: Sony Corporation, Tokyo (JP); Sony Mobile Commuications Inc., Tokyo (JP)

( * ) Notice: Subject to any disclaimer, the term of this patent is extended or adjusted under 35 U.S.C. 154(b) by 2324 days.

(21) Appl. No.: 12/120,589

(22) Filed: May 14, 2008

(65) Prior Publication Data

US 2009/0287485 A1 Nov. 19, 2009

(51) Int. Cl.
*H04R 1/08* (2006.01)
*H04R 29/00* (2006.01)
(Continued)

(52) U.S. Cl.
CPC .......... *G10L 21/0208* (2013.01); *G10L 15/01* (2013.01); *G10L 15/20* (2013.01);
(Continued)

(58) Field of Classification Search
USPC ..... 704/200–210, 220–229, 233–256.8, 271, 704/276, E19.001–E19.049,
(Continued)

(56) References Cited

U.S. PATENT DOCUMENTS 3,746,789 A * 7/1973 Alcivar ................. 379/175
4,718,096 A * 1/1988 Meisel ................. 704/253
(Continued)

FOREIGN PATENT DOCUMENTS

EP 1 536 414 A2 6/2005

OTHER PUBLICATIONS

"Face." Princeton WordNet. <http://wordnetweb.princeton.edu/perl/webwn?s=face>. Accessed Nov. 7, 2011.*
(Continued)

*Primary Examiner* — Fariba Sirjani
(74) *Attorney, Agent, or Firm* — Myers Bigel, P.A.

(57) ABSTRACT

Electronic devices and methods are disclosed that adaptively filter a microphone signal responsive to vibration that is sensed in the face of a user speaking into a microphone of the device. An electronic device can include a microphone, a vibration sensor, a vibration characterization unit, and an adaptive sound filter. The microphone generates a microphone signal that can include a user speech component and a background noise component. The vibration sensor senses vibration of the face while a user speaks into the microphone, and generates a vibration signal containing frequency components that are indicative of the sensed vibration. The vibration characterization unit generates speech characterization data that characterize at least one of the frequency components of the vibration signal that is associated with the speech component of the microphone signal. The adaptive sound filter filters the microphone signal using filter coefficients that are tuned in response to the speech characterization data to generate a filtered speech signal with an attenuated background noise component relative to the user speech component from the microphone signal.

21 Claims, 6 Drawing Sheets

(51) Int. Cl.
  *G10L 15/20*    (2006.01)
  *G10L 15/00*    (2013.01)
  *G10L 25/00*    (2013.01)
  *G10L 21/0208*  (2013.01)
  *H04R 1/02*     (2006.01)
  *G10L 15/01*    (2013.01)
  *G10L 25/03*    (2013.01)
  *G10L 21/0232*  (2013.01)
  *G10L 25/18*    (2013.01)

(52) U.S. Cl.
  CPC .............. *G10L 25/00* (2013.01); *G10L 25/03* (2013.01); *H04R 1/02* (2013.01); *H04R 1/08* (2013.01); *H04R 29/00* (2013.01); *G10L 21/0232* (2013.01); *G10L 25/18* (2013.01)

(58) Field of Classification Search
  USPC ..... 704/E21.001–E21.02, E11.001–E11.007; 398/39, 118–131; 381/56–60, 71.1–73.1, 381/95–110, 150–433
  See application file for complete search history.

(56) References Cited

U.S. PATENT DOCUMENTS

| | | | | |
|---|---|---|---|---|
| 5,171,930 | A * | 12/1992 | Teaney | 84/725 |
| 5,471,009 | A * | 11/1995 | Oba et al. | 84/645 |
| 5,574,794 | A * | 11/1996 | Valley | 381/361 |
| 5,828,995 | A * | 10/1998 | Satyamurti et al. | 358/1.18 |
| 6,031,922 | A * | 2/2000 | Tibbetts | 381/313 |
| 6,091,523 | A * | 7/2000 | Brandstetter | 398/39 |
| 6,154,551 | A * | 11/2000 | Frenkel | 381/172 |
| 6,185,529 | B1 * | 2/2001 | Chen et al. | 704/251 |
| 6,614,911 | B1 * | 9/2003 | Watson et al. | 381/86 |
| 6,647,368 | B2 * | 11/2003 | Nemirovski | 704/270 |
| 6,728,385 | B2 * | 4/2004 | Kvaløy et al. | 381/328 |
| 7,004,582 | B2 * | 2/2006 | Jannard et al. | 351/158 |
| 7,269,266 | B2 * | 9/2007 | Anjanappa et al. | 381/151 |
| 7,616,768 | B2 * | 11/2009 | Watson et al. | 381/71.4 |
| 8,340,309 | B2 * | 12/2012 | Burnett et al. | 381/71.6 |
| 2002/0012441 | A1 * | 1/2002 | Matsunaga et al. | 381/381 |
| 2002/0080982 | A1 * | 6/2002 | Paritsky et al. | 381/172 |
| 2002/0114477 | A1 * | 8/2002 | Paritsky et al. | 381/172 |
| 2002/0194005 | A1 * | 12/2002 | Lahr | 704/271 |
| 2003/0179888 | A1 * | 9/2003 | Burnett et al. | 381/71.8 |
| 2005/0234715 | A1 * | 10/2005 | Ozawa | 704/226 |
| 2005/0244020 | A1 * | 11/2005 | Nakajima et al. | 381/151 |
| 2006/0120537 | A1 * | 6/2006 | Burnett et al. | 381/71.6 |
| 2006/0120546 | A1 * | 6/2006 | Tanaka et al. | 381/315 |
| 2006/0287852 | A1 | 12/2006 | Liu et al. | |
| 2007/0003096 | A1 * | 1/2007 | Nam | 381/382 |
| 2007/0291953 | A1 * | 12/2007 | Ngia et al. | 381/71.6 |
| 2008/0071532 | A1 * | 3/2008 | Ramakrishnan et al. | 704/233 |
| 2008/0112569 | A1 * | 5/2008 | Asada | 381/71.1 |
| 2009/0022351 | A1 * | 1/2009 | Wieland et al. | 381/364 |
| 2009/0052698 | A1 * | 2/2009 | Rader et al. | 381/151 |
| 2009/0175478 | A1 * | 7/2009 | Nakajima et al. | 381/361 |
| 2009/0216352 | A1 * | 8/2009 | Glebe et al. | 700/94 |
| 2009/0274325 | A1 * | 11/2009 | Abolfathi | 381/151 |
| 2009/0287485 | A1 * | 11/2009 | Glebe | 704/233 |

OTHER PUBLICATIONS

Graciarena et al. "Combining Standard and Throat Microphones for Robust Speech Recognition" *IEEE Signal Processing Letters* 10(3):72-74.

Notification of Transmittal of the International Search Report and the Written Opinion of the International Searching Authority, or the Declaration, International Search Report and Written Opinion of the International Searching Authority, PCT International Application No. PCT/IB2008/054812, Apr. 7, 2009.

Zheng et al. "Air- and Bone-Conductive Integrated Microphones for Robust Speech Detection and Enhancement" *IEEE Workshop on Automatic Speech Recognition and Understanding*, pp. 249-254 (2003).

Zhu et al. "A Robust Speech Enhancement Scheme on the Basis of Bone-conductive Microphones" *IEEE Third International Workshop on Signal Design and Its Applications in Communications*, pp. 353-355 (2007).

* cited by examiner

ADAPTIVELY FILTERING A MICROPHONE SIGNAL RESPONSIVE TO VIBRATION SENSED IN A USER'S FACE WHILE SPEAKING

BACKGROUND OF THE INVENTION

The present invention relates to electronic devices that sense voice and, more particularly, to filtering microphone signals in cellular communication terminals and other electronic devices.

Background noise can have numerous undesirable effects on the microphone signal communicated by communication terminals or processed by other electronic devices. For example, background noise may obscure or mask the voice of a user that is sensed by the microphone and communicated from a communication terminal. Background noise can include wind noise and other noise sources, such as vehicles, voices from persons other than the user and/or background music. The background noise can also include feedback from a loudspeaker and/or the ear speaker through the microphone, which may also create an echo effect where, for example, a voice signal received from a user is fed back and heard by that user as an echo of their own voice. Some communication terminals include wind noise cancellation circuits and echo cancellation circuits that attempt to reduce the presence of noise in a microphone signal.

SUMMARY OF THE INVENTION

Various embodiments of the present invention are directed to electronic devices and methods that that adaptively filter a microphone signal responsive to vibration that is sensed in the facial vibrations of a user speaking into a microphone of the device.

According to some embodiments, an electronic device includes a microphone, a vibration sensor, a vibration characterization unit, and an adaptive sound filter. The microphone generates a microphone signal responsive to incident sound. The microphone signal can include a user speech component and a background noise component. The vibration sensor senses vibration of a user's face while the user speaks, and generates a vibration signal containing frequency components that are indicative of the sensed vibration. The vibration characterization unit generates speech characterization data that characterize at least one of the frequency components of the vibration signal that is associated with the speech component of the microphone signal. The adaptive sound filter filters the microphone signal using filter coefficients that are tuned in response to the speech characterization data to generate a filtered speech signal with an attenuated background noise component relative to the user speech component from the microphone signal.

In some further embodiments, the adaptive sound filter includes a digital finite impulse response (FIR) filter that is configured to filter the microphone signal to generate the filtered speech signal. The vibration characterization unit tunes FIR coefficients applied to each of a plurality of time-delay taps of the FIR filter in response to at least one of the frequency components of the vibration signal.

In some further embodiments, the vibration characterization unit includes a plurality of band pass filters and a frequency characterization unit. Each of the band pass filters is configured to pass-through a different narrow frequency bandwidth component of the vibration signal. The frequency characterization unit is configured to characterize the frequency components of the vibration signal that are associated with the speech component of the microphone signal in response to the magnitude of each of the narrow frequency bandwidth components passed through the respective band pass filters.

In some further embodiments, the adaptive sound filter tunes its filter coefficients in response to the magnitude of each of the narrow frequency bandwidth components passed through the respective band pass filters.

In some further embodiments, the frequency characterization unit is further configured to identify different harmonic content of formants spoken by the user in response to the magnitude of each of the narrow frequency bandwidth components passed through the respective band pass filters, and to tune the filter coefficients of the adaptive sound filter in response to the identified harmonic content of formants spoken by the user.

In some further embodiments, a voice codec is configured to encode the filtered speech signal, wherein the frequency characterization unit is further configured to tune coefficients used by the voice codec to encode the filtered speech signal in response to the identified harmonic content of formants spoken by the user.

In some further embodiments, the adaptive sound filter includes a plurality of variable band pass filters. Each of the band pass filters is tuned to pass-through a different narrow frequency bandwidth component of the microphone signal in response to the magnitude of each of the narrow frequency bandwidth components passed through the corresponding band pass filters of the vibration characterization unit. The filtered speech signal is generated based on combining the passed-through components of the microphone signal output by the variable band pass filters of the adaptive sound filter.

In some further embodiments, the vibration characterization unit is further configured to correlate the frequency components of the vibration signal to corresponding frequency components of the microphone signal, and to generate the speech characterization data to be indicative of a result of the correlation.

In some further embodiments, a housing enclosing the microphone, the vibration sensor, the vibration characterization unit, and the adaptive sound filter. The vibration sensor includes an accelerometer that is attached to an inner surface of the housing and configured to sense vibration conducted from the user's face through the housing to the vibration sensor.

In some further embodiments, the housing includes a raised edge portion that projects away from a major portion of a front surface of the housing to urge contact with the face of the user speaking into the microphone. The vibration sensor is attached to an inner surface of the raised edge portion of the housing to sense vibration from contacting the user's face while the user is speaking.

In some further embodiments, at least a major portion of the raised edge portion of the housing includes a more rigid material than the major portion of the front surface of the housing to improve conduction of higher frequency components of vibration from the user's face through the raised edge portion of the housing to the vibration sensor.

In some further embodiments, the vibration sensor includes a light source, a light sensor, and a comparison circuit. The light source is configured to generate coherent light that is modulated by a known signal waveform to illuminate adjacent facial skin of the user speaking into the microphone. The light sensor is configured to generate a sensed light signal in response to sensing reflection of the light from the adjacent facial skin, the sensed light signal being modulated by vibration of the illuminated facial skin. The comparison circuit is configured to compare the known signal waveform to the sensed light signal to generate the vibration signal containing frequency components that are indicative of the vibration of the illuminated facial skin of the user.

In some further embodiments, the comparison circuit is configured to modulate the vibration signal to track over time phase differences between the known signal waveform, which modulates the light output by the light source, and the sensed light signal.

In some further embodiments, the light source includes a laser diode.

Some other embodiments provide a method that includes operating a circuit to sense vibration of a user's face while the user speaks into a microphone and to generate a vibration signal containing frequency components that are indicative of the sensed vibration. Speech characterization data is generated that characterizes at least one of the frequency components of the vibration signal that is associated with a speech component of a microphone signal generated by the microphone responsive to incident sound. The microphone signal is adaptively filtered using filter coefficients that are tuned in response to the speech characterization data to generate a filtered speech signal with an attenuated background noise component relative to the speech component of the microphone signal.

In some further embodiments, the adaptive filtering includes filtering the microphone signal to generate the filtered speech signal using a digital finite impulse response (FIR) filter, and tuning FIR coefficients applied to each of a plurality of time-delay taps of the FIR filter in response to the at least one of the frequency components of the vibration signal.

In some further embodiments, the generation of the speech characterization data includes filtering the vibration signal using a plurality of band pass filters that are each configured to pass-through a different narrow frequency bandwidth component of the vibration signal, and generating the speech characterization data in response to the magnitude of each of the narrow frequency bandwidth components passed through the respective band pass filters.

In some further embodiments, the adaptive filtering includes tuning the filter coefficients in response to the magnitude of each of the narrow frequency bandwidth components passed through the respective band pass filters.

Some other embodiments provide an electronic device that includes a microphone, housing, a vibration sensor, a vibration characterization unit, and an adaptive sound filter. The microphone is configured to generate a microphone signal responsive to incident sound. The microphone signal can include a user speech component and a background noise component. The housing encloses the microphone and has a raised edge portion that projects away from a major portion of a front surface of the housing to urge contact with the user's face while the user speaks into the microphone. The vibration sensor is attached to an inner surface of the housing and configured to sense vibration conducted from the user's face through the housing to the vibration sensor and to generate a vibration signal containing frequency components that are indicative of the sensed vibration. The vibration characterization unit includes a plurality of band pass filters, each configured to pass-through a different narrow frequency bandwidth component of the vibration signal. The adaptive sound filter filters the microphone signal using filter coefficients that are tuned in response to the magnitude of each of the narrow frequency bandwidth components passed through the respective band pass filters to generate a filtered speech signal with an attenuated background noise component relative to the user speech component of the microphone signal.

In some further embodiments, a voice codec is configured to encode the filtered speech signal. The vibration characterization unit is further configured to identify different harmonic content of formants spoken by the user in response to the magnitude of each of the narrow frequency bandwidth components passed through the respective band pass filters, and to tune the filter coefficients used by the voice codec to encode the filtered speech signal in response to the identified harmonic content of formants spoken by the user.

Other electronic devices and/or methods according to embodiments of the invention will be or become apparent to one with skill in the art upon review of the following drawings and detailed description. It is intended that all such additional electronic devices and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal microprocessor), and/or analog circuitry. The operations that are described below with regard to the figures can therefore be at least partially implemented as computer-readable program code executed by a computer (e.g., microprocessor).

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

In accordance with various embodiments of the present invention, an electronic device adaptively filters a microphone signal in response to vibration sensed in the face of the user speaking into the microphone. For purposes of illustration and explanation only, various embodiments of such electronic devices are described herein in the context of an exemplary mobile wireless communication terminal ("terminal"), such as a cellular terminal, a local area network (WLAN) and/or Bluetooth terminal (e.g., a voice-over-IP phone). It will be understood, however, that the present invention is not limited to such embodiments and may be embodied generally in any electronic device that filters a microphone signal in accordance with at least one embodiment described herein. Further non-limiting exemplary electronic devices include a Bluetooth or other wireless communication headset, a digital audio recorder, a personal data assistant (PDA), and a digital camera.

Figure 1:
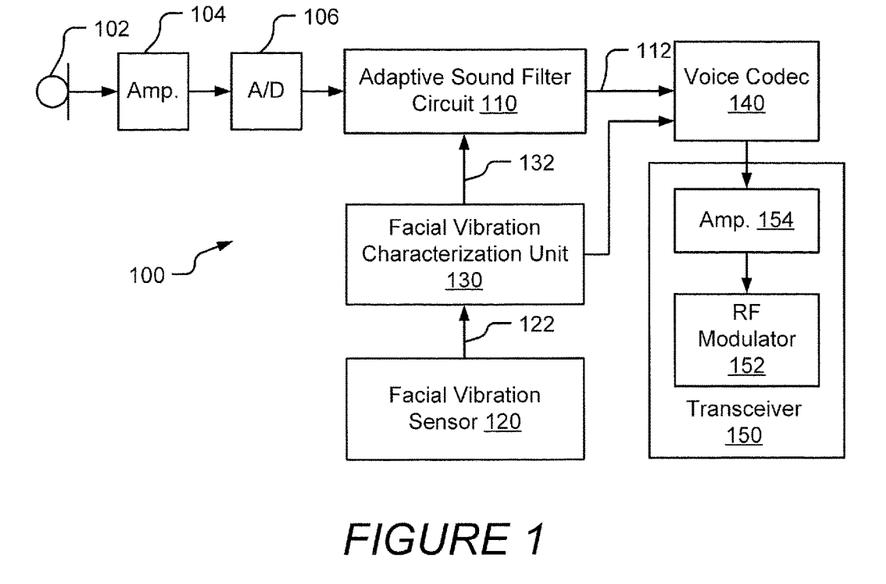
FIG. 1 is a block diagram of circuitry of a communication terminal that adaptively filters a microphone signal in response to vibration sensed in the face of the user speaking into the microphone in accordance with some embodiments.

FIG. 1 is a block diagram of electronic circuitry of a terminal 100 that adaptively filters a microphone signal in response to vibration that is sensed in the face of a user speaking into a microphone 102. According to some embodiments, the microphone 102 generates a microphone signal responsive to incident sound, and typically includes a user speech component and an undesirable background noise component. An adaptive sound filter circuit (adaptive filter) 110 attenuates the undesirable background noise component in response to data that characterizes vibration of the face of a user speaking into the microphone 102. Accordingly, the undesirable background noise component can be distinguished from the user speech component of the microphone signal and, thereby, can be more robustly attenuated by the electronic circuitry using the sensed vibration characteristics of the face of the speaking user.

More particularly, the microphone signal is amplified by an amplifier 104 and converted to a digital signal by an analog-to-digital (A/D) converter 106 and provided to the adaptive filter 110. A facial vibration sensor 120 is configured to sense vibration of the face while the user speaks into the microphone 102 and to generate a vibration signal 122 containing frequency components that are indicative of the sensed vibration. The vibration sensor 120 may, for example, include an accelerometer such as a piezoelectric device that generates a variable charge that tracks acceleration of the device. A facial vibration characterization unit 130 is configured to characterize at least one of the frequency components of the vibration signal that is associated with the speech component of the microphone signal, and to generate therefrom speech characterization data 132 that is used by the adaptive filter 110 to filter the microphone signal. The adaptive filter 110 filters the digitized microphone signal using filter coefficients that are tuned in response to the speech characterization data 132 to generate a filtered speech signal 112 with an attenuated background noise component relative to the user speech component of the microphone signal.

The terminal 100 can further include a voice encoder/decoder (codec) 140 and a transceiver 150. The voice codec 140 encodes the filtered speech signal 112 in preparation for transmission by the transceiver 150. The vibration characterization unit 130 can be configured to tune the coefficients that are used by the coding algorithm of the voice codec 140 to encode the filtered speech signal 112 responsive to the speech characterization data 132. The voice codec 140 may, for example, use a coding algorithm that is defined by one or more industry standard cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). Alternatively or additionally, the voice codec 140 may use a coding algorithm is defined by one or more industry standard protocols for communicating digital voice through a wireless local area network (WLAN) and/or a Bluetooth network, such as used to communicate voice over a voice-over-IP network.

The encoded voice is modulated by a RF modulator 152 and amplified by an amplifier 154 for transmission through an antenna. The RF modulator 152 may, for example, be configured to communicate according to one or more of the industry-standard wireless communication protocols identified above.

Although separate functional blocks have been shown in FIG. 1 for purposes of illustration and discussion, it is to be understood that their functionality described herein may be integrated within a common integrated circuit package or distributed among more than one integrated circuit package.

Figure 2:
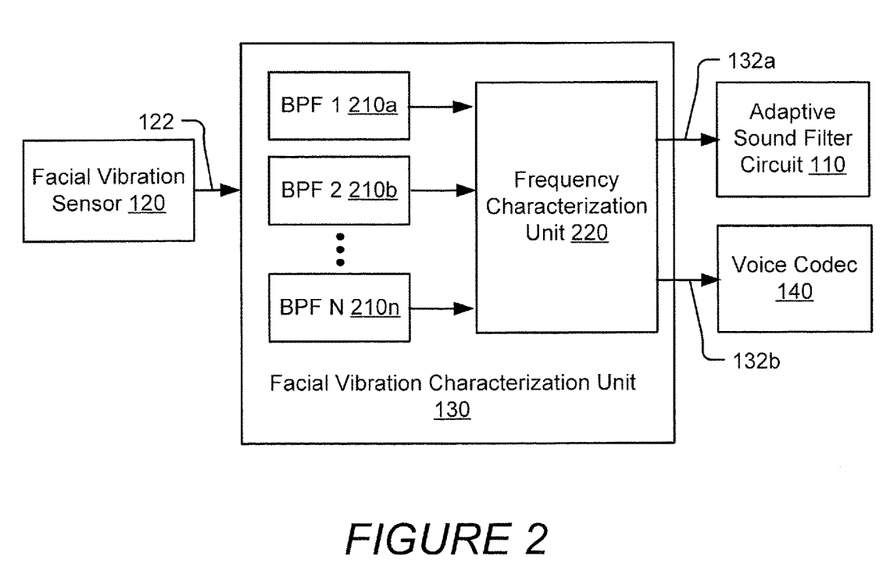
FIG. 2 is a further block diagram of the vibration characterization unit of FIG. 1 in accordance with some embodiments.

FIG. 2 is a further block diagram of the vibration characterization unit 130 of FIG. 1 in accordance with some embodiments. Referring to FIG. 2, the vibration characterization unit 130 can include a plurality of band pass filters 210a, 210b, . . . , 210n and a frequency characterization unit 220. Each of the band pass filters 210a, 210b, . . . , 210n can be configured to pass-through a different narrow frequency bandwidth component of the vibration signal 122. The frequency characterization unit generates the speech characterization data 132a-132b that characterizes the frequency components of the vibration signal in response to the magnitude of each of the narrow frequency bandwidth components passed through the respective band pass filters.

Because the vibration signal 122 corresponds to vibration of the face of the user who is speaking, the outputs of the band pass filters 210a, 210b, . . . , 210n is associated with the speech component of the microphone signal 122 and, correspondingly, decoupled from the undesirable background noise component in the microphone signal 122. The adaptive filter 110 can be configured to tune its filter coefficients in response to the magnitude of each of the narrow frequency bandwidth components passed through the respective band pass filters 210a, 210b, . . . , 210n, which can be indicated by the speech characterization data 132a.

In some embodiments, the adaptive filter 110 can include a digital finite impulse response (FIR) filter that is configured to filter the microphone signal to generate the filtered speech signal 112. The vibration characterization unit 130 tunes FIR coefficients applied to each of a plurality of time-delay taps of the FIR filter in response to the at least one of the frequency components of the vibration signal 122. The values of the FIR coefficients can be varied in response to the magnitude of each of the narrow frequency bandwidth components passed through the respective band pass filters 210a, 210b, . . . , 210n. For example, a first FIR coefficient can be tuned responsive to the output of the first BPF_1 210a, a second FIR coefficient can be tuned responsive to the output of the second BPF_2 210b, and, so on, through an N'th FIR coefficient being tuned responsive to the output of the N'th BPF_N 210n. Accordingly, the FIR filter can be tuned in response vibrations that are sensed on the face of the user who is speaking into the microphone 102.

In some other embodiments, the adaptive filter 110 can include a plurality of variable band pass filters, with each of the band pass filters having a variable gain that is applied to pass-through a different narrow frequency bandwidth component of the microphone signal, with the variable gains being tuned in response to the magnitude of each of the narrow frequency bandwidth components passed through the corresponding band pass filters band pass filters 210a, 210b, . . . , 210n of the vibration characterization unit 130. Thus, for example, the gain of a first band pass filter can be tuned in response to the output of the first BPF_1 210a, the gain of a second band pass filter can be tuned in response to the output of the second BPF_2 210b, and, so on, with the gain of the Nth band pass filter being tuned in response to the output of the N'th BPF_N 210n. The filtered speech signal 112 can then be generated based on combining the passed-through components of the microphone signal that are output by the variable band pass filters of the adaptive sound filter 110.

The frequency characterization unit 220 can be further configured to identify different harmonic content of formants spoken by the user in response to the magnitude of each of the narrow frequency bandwidth components passed through the respective band pass filters 210a, 210b, . . . , 210n, which can be indicated by the speech characterization data 132a-132b. Formants are the characteristic frequency spectrum of various parts of speech caused by acoustic resonances formed by humans when speaking. The adaptive filter 110 can tune its filter coefficients in response to the speech characterization data 132a identifying harmonic content of formants spoken by the user. The voice codec 140 can tune the coefficients that are used by the coding algorithm therein to encode the filtered speech signal 112 responsive to the speech characterization data 132b.

The frequency characterization unit 220 can be configured to identify the frequency as a function of time of a fundamental tone and/or associated harmonics of spoken vowels and/or consonants, and to tune the filter coefficients of the adaptive filter 110 to improve the continuation of background noise relative to the speech component in the filtered speech signal 112.

For example, a spoken vowel causes vibrations having characteristic fundamental and harmonic frequencies. These frequencies can be characterized by passing the vibration signal 122 through the band pass filters 210a-n, with each band pass filter centered around the respective frequencies of the fundamental and harmonics of a different vowel. In this manner, the frequency characteristics can be used to identify the spoken vowel, which can be used as an input to the voice coding algorithms used by the voice codec 140.

Similarly, the onset and ending frequency and associated time transients of vowels provide information on what type of consonant is being formed. The consonant itself can have transient frequency contents which are unique to each type of consonant, and which may use by the frequency characterization unit 220 to identify the consonant. For example, an "s" can have frequency components primarily in a region around five kHz.

Figure 3:
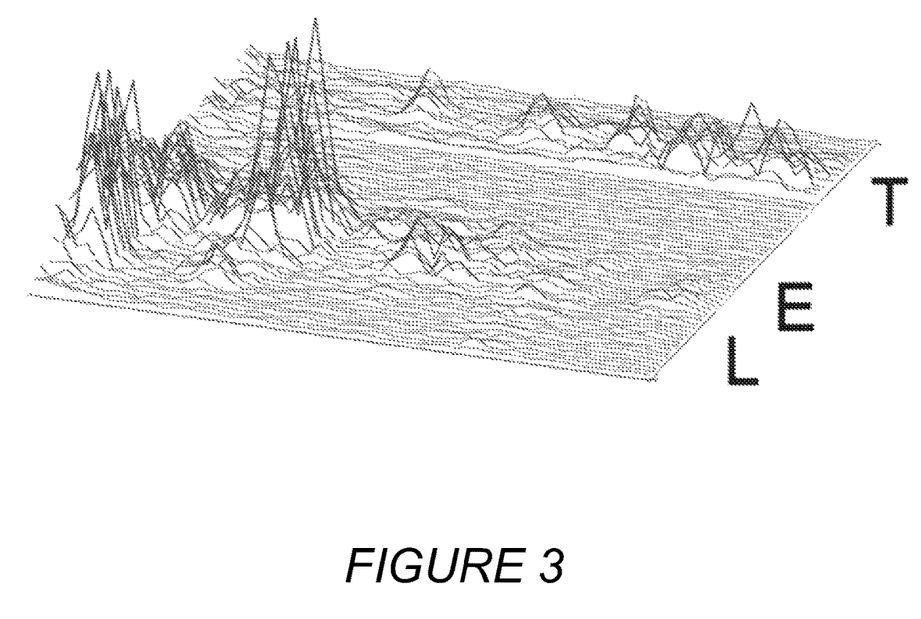
FIG. 3 is a three-dimensional graph over time of exemplary variation in amplitude and frequency changes over time as the word "let" is pronounced by a user, and further illustrates different harmonic content of spoken formants that can be identified and used by the vibration characterization unit of FIG. 1 to provide input to the voice coding algorithms used by the voice codec of FIG. 1 in accordance with some embodiments.

FIG. 3 is a three-dimensional graph over time of exemplary variation in amplitude and frequency changes over time as the word "let" is pronounced by a user, and further illustrates different harmonic content of spoken formants that can be identified and used by the frequency characterization unit 220 to provide input to the voice coding algorithms used by the voice codec 140, and which is further described at the web location "assap.org/newsite/articles/analysing%20audio%20evp." As shown in FIG. 3, a 10 ms gap occurs between the beginning of the spoken "e" vowel formant and the beginning of the spoken "t" consonant formant. Accordingly, the frequency characterization unit 220 can correlate the frequency components of the vibration signal 122 to corresponding frequency components of the microphone signal to generate speech characterization data to tune filtering by the adaptive filter 110 and/or the voice coding by the voice codec 140. In some embodiments, the speech characterization data is used to tune predictive voice coefficients of the voice codec 140 that are used to predict and encode the speech pattern.

Figure 4:
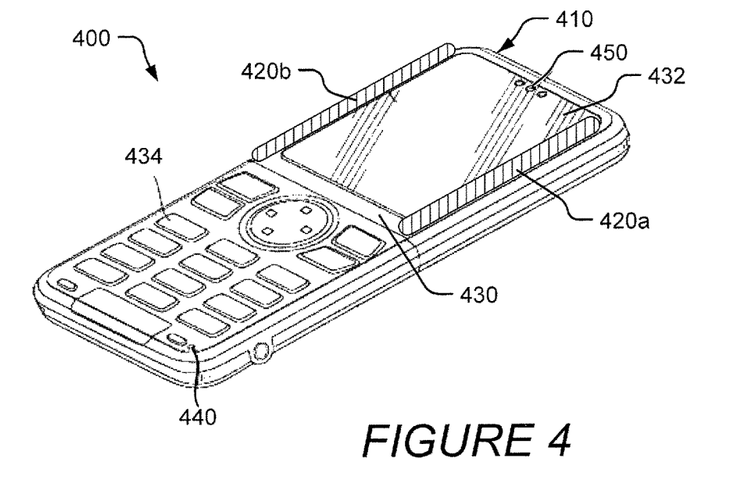
FIG. 4 is a diagram of a communication terminal having a raised edge portion that projects away from a major portion of a front surface of the housing to urge contact with the face of a user speaking into the microphone in accordance with some embodiments.

FIG. 4 is a diagram of a terminal 400 that includes a terminal housing 410 having a pair of raised edge portions 420a and 420b that project away from a major portion of a front surface 430 of the housing 410 in accordance with some embodiments. The illustrated terminal 400 further includes a display 432 and a keypad 434.

The raised edge portions 420a and 420b urge contact with the face of a user who is speaking into a microphone via an opening 440 while listening to a speaker via an opening 450. Accordingly, while the user is holding the speaker opening 450 to the user's ear and speaking into the microphone opening 440, one of raised edge portions 420a and 420b may contact the face of the speaker so that vibrations from the face are conducted through the respective raised edge portion and to a vibration sensor.

In some embodiments, the terminal 400 can include a pair of vibration sensors 120, each of which is attached to an inner surface of a different one of the raised edge portions 420a and 420b of the front surface 430. Such configuration may improve the conduction of vibration from the face of the speaker through the contacting raised edge portion and to the attached vibration sensor 120, and, thereby, improve the sensitivity of the vibration sensor 120.

In some embodiments, at least a major portion of the raised edge portions 420a and 420b of the front surface 430 can include a more rigid material then the major portion 430 of the front/back surface of the housing to improve conduction of higher frequency components of the vibration from the face of the user through one of the raised edge portions 420a and 420b to the associated vibration sensor 120. For example, the raised edge portions 420a and 420b of the front surface 430 may be formed from metal while another major portion of the front surface 430 can be formed from a less rigid plastic, such as using one or more typically plastics of conventional terminals and/or using a rubberized material on the upper surface.

In contrast, a less rigid material used for the raised edge portions 420a and 420b, such as a softer plastic or rubberized coating, could attenuate higher frequency components of the vibrations (i.e., functioning as a low-pass filter) which may decrease the sensitivity of the vibration sensor 120.

Figure 5:
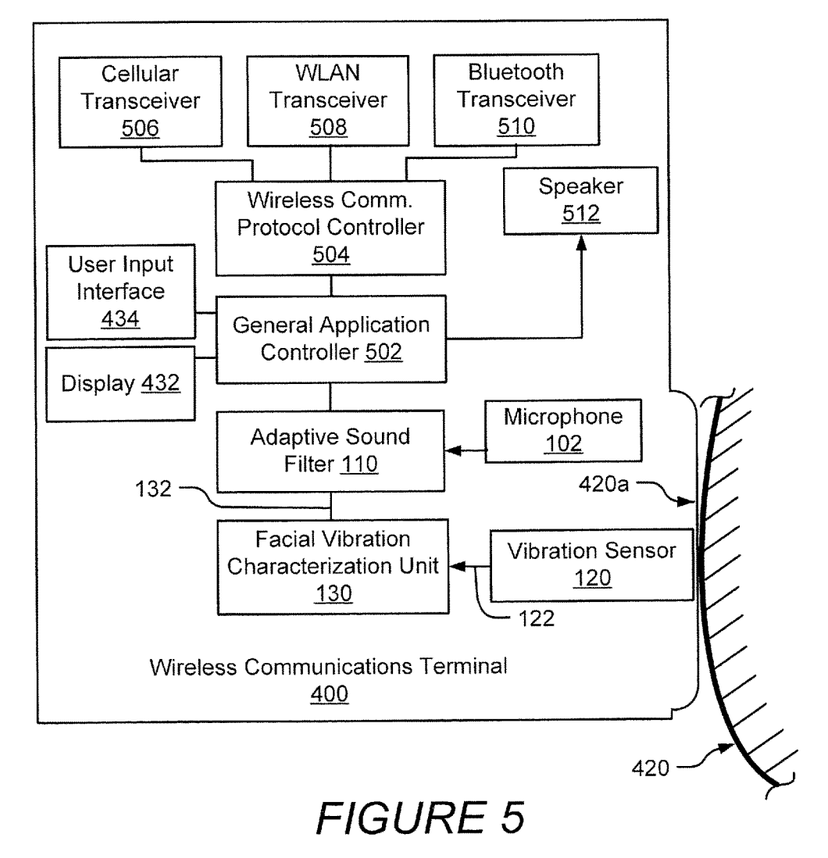
FIG. 5 is a block diagram of exemplary components of a communication terminal, such as the communication terminal of FIG. 4, according to some embodiments that adaptively filters a microphone signal in response to vibration sensed in the face of the user speaking into the microphone.

FIG. 5 is a block diagram of exemplary components of the terminal 400 of FIG. 4, some of which adaptively filter a microphone signal in response to vibration sensed in the face of the user speaking into the microphone in accordance with some embodiments. Referring to FIG. 5, the terminal 400 includes the microphone 102, the vibration sensor 120, the vibration characterization unit 130, and the adaptive filter 110 which may be configured to operate as described above with regard to FIGS. 1-4. The terminal 400 can further include a user input interface 434 (e.g., a keypad or touchscreen), a display 432, a general application controller 502, a wireless communication protocol controller 504, a cellular transceiver 506, a WLAN transceiver 508 (e.g., compliant with one or more of the IEEE 801.11a-g standards), a Bluetooth transceiver 510, and/or a speaker 512.

The cellular transceiver 506 can be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). The terminal 110 may thereby be configured to communicate across a wireless air interface with a cellular transceiver base station and with another terminal via the WLAN transceiver 508 and/or the Bluetooth transceiver 510.

As shown in FIG. 5, the vibration sensor 120 can be attached to an inner surface of the raised edge portions 420a of the front surface 430 to urge contact with the face 520 of the user who is listening to the speaker 512 and speaking into the microphone 102. User speech generates vibrations in the user's facial bones. The raised edge portion 420a of the housing can be pressed against one or more of the facial bones, such as the jaw bone/cheek bone, to compress the intervening flesh and improve the conduction of vibration from the bone through the raised edge portion 420a to the vibration sensor 120. Because the user's facial bones can more effectively resonate in response to the speech and provide a lower impedance to the speech vibration than the facial skin 520, pressing the raised edge portion 420a of the housing toward a facial bone may improve the sensitivity of the vibration sensor 120 to detecting the user's speech. Vibration sensor 120 generates the vibration signal 122 which, as described above, contains frequency components that are indicative of the user's speech. As was further described above, the adaptive filter 110 filters the microphone signal using filter coefficients that are tuned in response to the data output by the vibration characterization unit 130 to generate the filtered speech signal 112 having an attenuated background noise component relative to the user speech component the microphone signal 122.

The general application controller 502 can control the various other components of the terminal 400, and may be configured to carry out the functionality of the voice codec 140. The general application controller 502 may therefore encode the filtered microphone signal 112 using one or more voice coding and decoding algorithms, which may be configured according to the wireless communication protocols specified for one or more of the transceivers 506-510. The wireless communication protocol controller 504 can further format the encoded signal according to one or more wireless communication protocols for transmission through a corresponding one or more of the transceivers 506-510.

Although FIGS. 4 and 5 illustrate an exemplary terminal and related functional circuits, it will be understood that the present invention is not limited to such configurations, but is intended to encompass any configuration capable of carrying out the operations described herein. For example, although separate functional blocks have been shown in FIG. 5 for purposes of illustration and discussion, it is to be understood that their functionality described herein may be integrated within a common integrated circuit package or distributed among more than one integrated circuit package.

Figure 6:
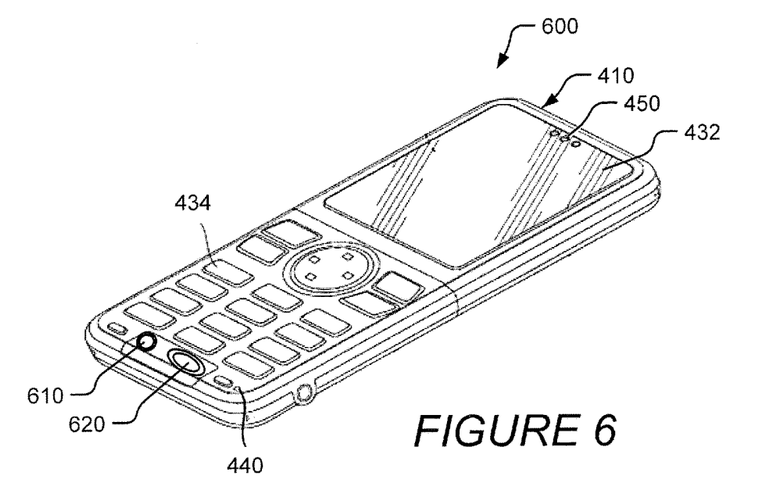
FIG. 6 is a diagram of another communication terminal in accordance with some embodiments that includes a light source and a light sensor that are configured to sense vibration of adjacent illuminated facial skin of a user speaking into the microphone.
Figure 7:
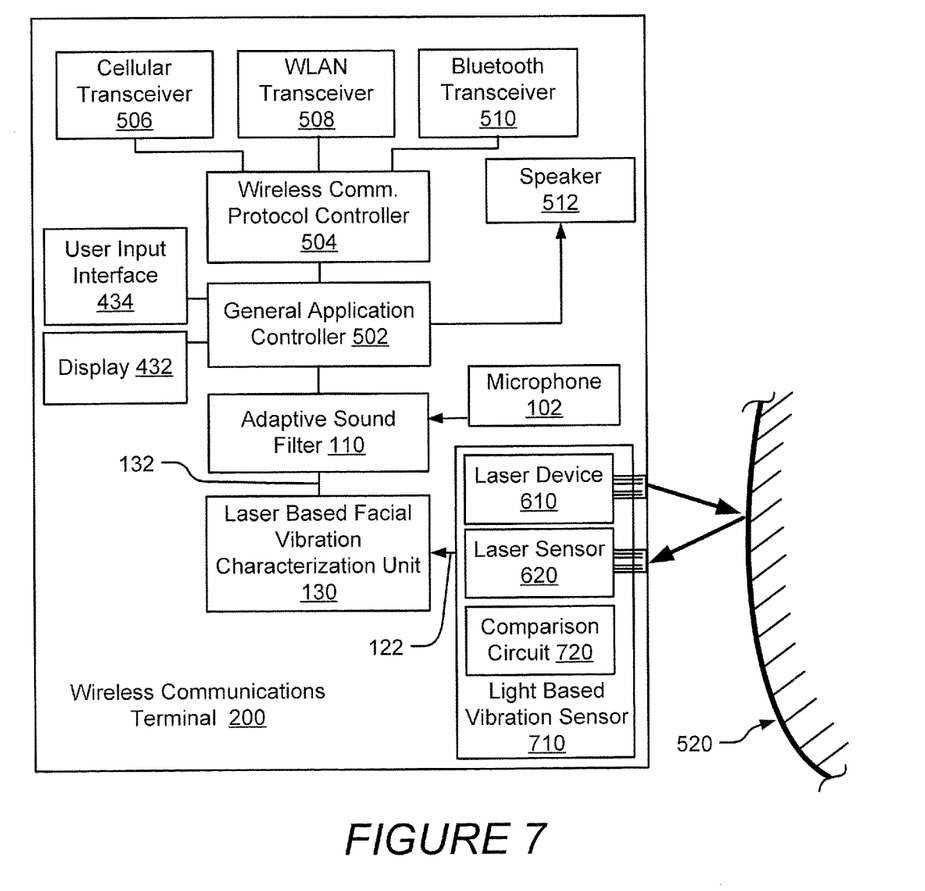
FIG. 7 is a block diagram of exemplary components of a communication terminal, such as the communication terminal of FIG. 7, according to some embodiments that adaptively filters a microphone signal in response to light based sensing of vibration of the face of a user speaking into the microphone.

FIG. 6 is a diagram of a terminal 600 that includes a light source 610 and a light sensor 620 that are configured to sense vibration in the facial skin of a user speaking into the microphone opening in accordance with some embodiments. FIG. 7 is a block diagram of exemplary components of the terminal 600 of FIG. 6. The features of terminal 600 that are similar to the features of terminal 400 are labeled with the same number.

A primary difference between the terminals 400 and 600, is the configuration of the light source 610 and the light sensor 620 to function as a light based vibration sensor 710. The light source 610 is configured to generate coherent light that is modulated by a known signal waveform to illuminate adjacent facial skin 520 of the user as the user speaks into the microphone 102. As shown, the light sensor 610 may include a laser device. The light sensor 620 is configured to generate a sensed light signal in response to sensing reflection of the light from an illuminated portion of the adjacent facial skin 520. The sensed light signal is modulated by vibration of the illuminated portion of the adjacent facial skin 520.

A comparison circuit 720 compares the known signal waveform, which was used to modulate the light output by the light source 610, to the sensed light signal from the light sensor 620 to generate the vibration signal 122 contain frequency components that are indicative of the vibration of the illuminated portion of the adjacent facial skin 520.

Figure 8:
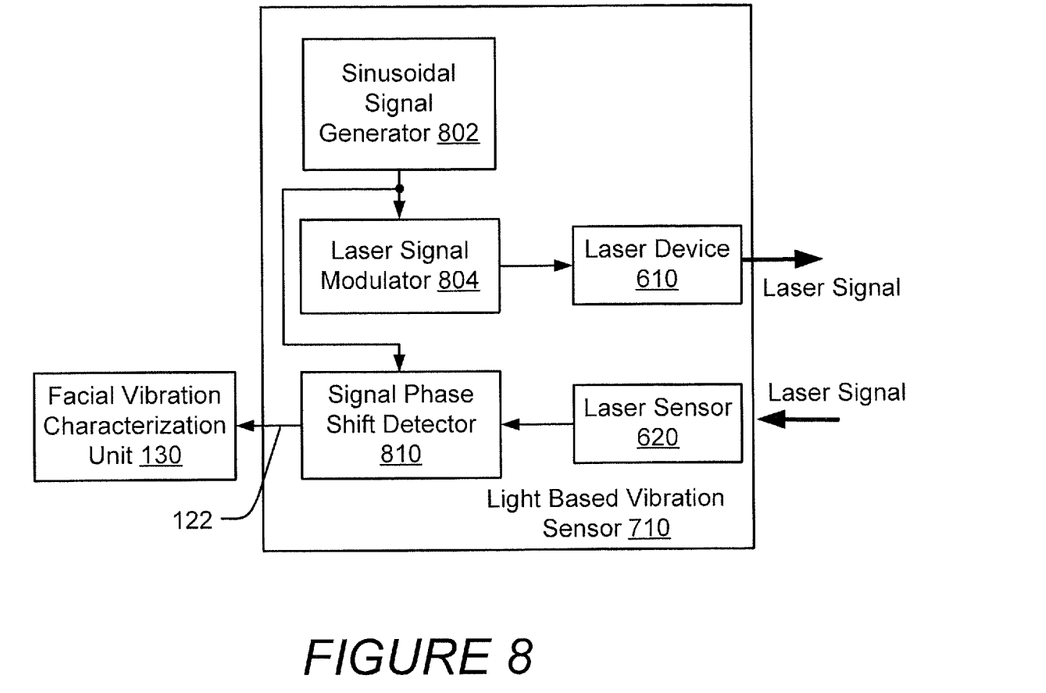
FIG. 8 is a further block diagram of a vibration sensor, such as that of FIG. 7, that includes a light source and a light sensor that are configured to sense vibration.

FIG. 8 is a further block diagram of the light based vibration sensor 710 of FIG. 7 in accordance with some embodiments. Referring to FIG. 8, the vibration sensor 710 can include a sinusoidal signal generator 802, a laser signal modulator 804, a laser device 610, a laser sensor 620, and a signal phase shift detector 810. The signal generator 802 generates a sinusoidal signal having a known frequency and phase relationship, which is used by the modulator 804 to modulate a signal that drives the laser device 610 to generate laser light that illuminates adjacent facial skin of a user. The signal phase shift detector 810 can function as comparator that measures phase shift between a laser signal from the sensor 620 to the known sinusoidal signal from the generator 802 and/or to the modulated signal output by the modulator 804.

As the user speaks, vibration of the facial skin modulates the waveform of the reflected laser signal that is sensed by the sensor 620. Accordingly, the phase shifts that are detected by the phase shift detector 810 between the outgoing signal and incoming signal indicates the frequency and amplitude of the vibration of the illuminated facial skin. The output of the phase shift detector 810 therefore can be used as the vibration signal 122. The vibration characterization unit 130 characterizes the frequency components of the vibration signal 122 that are associated with a speech component of the microphone signal from the microphone 102 (FIG. 7).

Because the light based vibration sensor 710 senses the facial vibration responsive to modulation of the reflected light, which inherently occurs at a very high frequency, it may provide substantially greater sensitivity over a much wider bandwidths of facial vibration than may be provided by the vibration sensor 120 which relies upon contact based transmission of the vibration from the skin 520 to the sensor 120. Moreover, the light based vibration sensor 710 does not require contact between the terminal 600 and the user's face and, therefore, may provide more robust measurement of the facial vibrations as the user moves the terminal 600 during a conversation.

Referring again to FIG. 7, the other components of the terminal 600 can be configured to operate in a similar manner to that described with a similarly numbered functional blocks shown in FIG. 5. Although the embodiments of the mechanically coupled vibration sensor (e.g., FIGS. 4 and 5) have been described separately from the optically coupled vibration sensor (e.g., FIGS. 6 and 7) for ease of illustration and description, the invention is not limited thereto. For example, an electronic device may combine mechanical sensing and optical sensing of facial vibrations by combining aspects of the embodiments of FIGS. 4-7.

Figure 9:
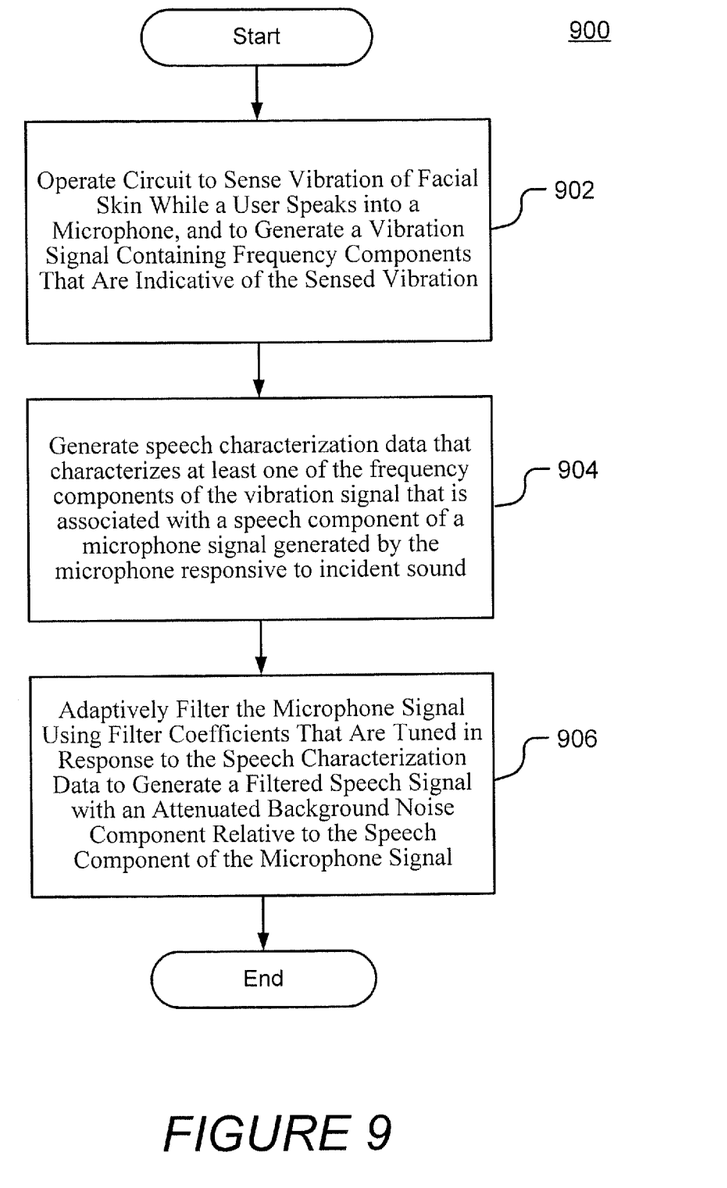
FIG. 9 is a flowchart of methods and operations that may be carried out by a mobile terminal or other electronic device to adaptively filter a microphone signal responsive to vibration that is sensed in the face of a user speaking into a microphone of the device.

FIG. 9 is a flowchart of exemplary methods and operations 900 that may be carried out by a mobile terminal or other electronic device to adaptively filter a microphone signal responsive to vibration that is sensed in the face of a user speaking into a microphone of the device. Referring to FIG. 8, at block 902, a circuit is operated to sense vibration of the face while a user speaks into a microphone, and to generate a vibration signal containing frequency components that are indicative of the sensed vibration. At block 904, speech characterization data is generated that characterizes at least one of the frequency components of the vibration signal that is associated with a speech component of a microphone signal generated by the microphone responsive to incident sound. At block 906, the microphone signal is adaptively filtered using filter coefficients that are tuned in response to the speech characterization data to generate a filtered speech signal with an attenuated background noise component relative to the speech component of the microphone signal.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. An electronic device comprising:
   a microphone that is configured to generate a microphone signal responsive to incident sound, the microphone signal including a user speech component and a background noise component;
   a housing enclosing the microphone, wherein the housing is positioned adjacent to and extends along a cheek of a user's face while the user speaks into the microphone to generate the speech component of the microphone signal and while positioning another portion of the housing adjacent to the user's ear;
   a vibration sensor enclosed by the housing that is configured to sense vibration of an external portion of the user's face while the user speaks into the microphone and to generate a vibration signal containing frequency components that are indicative of the sensed vibration;
   a vibration characterization unit enclosed by the housing that is configured to generate speech characterization data that characterize at least one of the frequency components of the vibration signal that is associated with the speech component of the microphone signal; and
   an adaptive sound filter enclosed by the housing that filters the microphone signal using filter coefficients that are tuned in response to the speech characterization data to generate a filtered speech signal with an attenuated background noise component relative to the user speech component of the microphone signal.

2. The electronic device of claim 1, wherein:
   the adaptive sound filter comprises a digital finite impulse response (FIR) filter that is configured to filter the microphone signal to generate the filtered speech signal; and
   the vibration characterization unit tunes FIR coefficients applied to each of a plurality of time-delay taps of the FIR filter in response to the at least one of the frequency components of the vibration signal.

3. The electronic device of claim 1, wherein the vibration characterization unit comprises:
   a plurality of band pass filters, each configured to pass-through a different narrow frequency bandwidth component of the vibration signal; and
   a frequency characterization unit that is configured to characterize the frequency components of the vibration signal that are associated with the speech component of the microphone signal in response to the magnitude of each of the narrow frequency bandwidth components passed through the respective band pass filters.

4. The electronic device of claim 3, wherein the adaptive sound filter tunes its filter coefficients in response to the magnitude of each of the narrow frequency bandwidth components passed through the respective band pass filters.

5. The electronic device of claim 3, wherein the frequency characterization unit is further configured to identify different harmonic content of formants spoken by the user in response to the magnitude of each of the narrow frequency bandwidth components passed through the respective band pass filters, and to tune the filter coefficients of the adaptive sound filter in response to the identified harmonic content of formants spoken by the user.

6. The electronic device of claim 5, further comprising a voice codec that is configured to encode the filtered speech signal, wherein the frequency characterization unit is further configured to tune coefficients used by the voice codec to encode the filtered speech signal in response to the identified harmonic content of formants spoken by the user.

7. The electronic device of claim 1, wherein the adaptive sound filter comprises a plurality of variable band pass filters, each tuned to pass-through a different narrow frequency bandwidth component of the microphone signal in response to the magnitude of each of the narrow frequency bandwidth components passed through the corresponding band pass filters of the vibration characterization unit, wherein the filtered speech signal is generated based on combining the passed-through components of the microphone signal output by the variable band pass filters of the adaptive sound filter.

8. The electronic device of claim 1, wherein the vibration characterization unit is further configured to correlate the frequency components of the vibration signal to corresponding frequency components of the microphone signal, and to generate the speech characterization data to be indicative of a result of the correlation.

9. The electronic device of claim 1, wherein the vibration sensor comprises an accelerometer that is attached to an inner surface of the housing and configured to sense vibration conducted from the face of the user through the housing to the vibration sensor.

10. The electronic device of claim 9, wherein:
the housing comprises a raised edge portion that projects away from a major portion of a front surface of the housing to urge contact with the face of the user speaking into the microphone; and
the vibration sensor is attached to an inner surface of the raised edge portion of the housing to sense vibration from contacting the face while the user is speaking.

11. The electronic device of claim 10, wherein at least a major portion of the raised edge portion of the housing comprises a more rigid material than the major portion of the front surface of the housing to cause increased conduction of higher frequency components of vibration from the face of the user through the raised edge portion of the housing to the vibration sensor.

12. The electronic device of claim 1, further comprising a speaker enclosed by the housing, wherein the speaker is positioned adjacent to the user's ear while the user speaks into the microphone to generate the speech component of the microphone signal.

13. A method comprising:
operating a circuit to sense vibration of an external portion of a user's face while the user speaks into a microphone and to generate a vibration signal containing frequency components that are indicative of the sensed vibration, wherein the microphone is enclosed by a housing that extends along a cheek of the user's face while the user speaks into the microphone and while positioning another portion of the housing adjacent to the user's ear;
generating speech characterization data that characterize at least one of the frequency components of the vibration signal that is associated with a speech component of a microphone signal generated by the microphone responsive to incident sound; and
adaptively filtering the microphone signal using filter coefficients that are tuned in response to the speech characterization data to generate a filtered speech signal with an attenuated background noise component relative to the speech component of the microphone signal.

14. The method of claim 13, wherein the adaptive filtering comprises:
filtering the microphone signal to generate the filtered speech signal using a digital finite impulse response (FIR) filter; and
tuning FIR coefficients applied to each of a plurality of time-delay taps of the FIR filter in response to the at least one of the frequency components of the vibration signal.

15. The method of claim 13, wherein the generation of the speech characterization data comprises:
filtering the vibration signal using a plurality of band pass filters that are each configured to pass-through a different narrow frequency bandwidth component of the vibration signal; and
generating the speech characterization data in response to the magnitude of each of the narrow frequency bandwidth components passed through the respective band pass filters.

16. The method of claim 15, wherein the adaptive filtering comprises tuning the filter coefficients in response to the magnitude of each of the narrow frequency bandwidth components passed through the respective band pass filters.

17. An electronic device comprising:
a microphone that is configured to generate a microphone signal responsive to incident sound, the microphone signal including a user speech component and a background noise component;
a housing enclosing the microphone, the housing positioned adjacent to and extending along a cheek of a user's face who is speaking into the microphone while positioning another portion of the housing adjacent to the user's ear, the housing having a raised edge portion that projects away from a major portion of a front surface of the housing to urge contact with an external portion of the user's face who is speaking into the microphone;
a vibration sensor attached to an inner surface of the raised edge portion of the housing and configured to sense vibration conducted from the external portion of the face of the user through the housing to the vibration sensor and to generate a vibration signal containing frequency components that are indicative of the sensed vibration;
a vibration characterization unit that includes a plurality of band pass filters, each configured to pass-through a different narrow frequency bandwidth component of the vibration signal; and
an adaptive sound filter that filters the microphone signal using filter coefficients that are tuned in response to the magnitude of each of the narrow frequency bandwidth components passed through the respective band pass filters to generate a filtered speech signal with an attenuated background noise component relative to the user speech component of the microphone signal.

18. The electronic device of claim 17, further comprising a voice codec that is configured to encode the filtered speech signal, wherein the vibration characterization unit is further configured to identify different harmonic content of formants spoken by the user in response to the magnitude of each of the narrow frequency bandwidth components passed through the respective band pass filters, and to tune the filter coefficients used by the voice codec to encode the filtered speech signal in response to the identified harmonic content of formants spoken by the user.

19. An electronic device comprising:
a microphone that is configured to generate a microphone signal responsive to incident sound, the microphone signal including a user speech component and a background noise component;
a housing enclosing the microphone, wherein the housing is positioned adjacent to and extends along a cheek of a user's face while the user speaks into the microphone to generate the speech component of the microphone signal and while positioning another portion of the housing adjacent to the user's ear;
a vibration sensor that is configured to sense vibration of an external portion of the user's face while the user speaks into the microphone and to generate a vibration signal containing frequency components that are indicative of the sensed vibration, wherein the vibration sensor comprises:
a light source that is configured to generate coherent light that is modulated by a known signal waveform to illuminate adjacent external facial skin of the user speaking into the microphone;
a light sensor that is configured to generate a sensed light signal in response to sensing reflection of the light from the adjacent external facial skin, the sensed light signal being modulated by vibration of the illuminated external facial skin; and
a comparison circuit that is configured to compare the known signal waveform to the sensed light signal to generate the vibration signal containing frequency components that are indicative of the vibration of the illuminated external facial skin of the user;
a vibration characterization unit that is configured to generate speech characterization data that characterize at least one of the frequency components of the vibration signal that is associated with the speech component of the microphone signal; and
an adaptive sound filter that filters the microphone signal using filter coefficients that are tuned in response to the speech characterization data to generate a filtered speech signal with an attenuated background noise component relative to the user speech component of the microphone signal.

20. The electronic device of claim 19, wherein the comparison circuit is configured to modulate the vibration signal to track over time phase differences between the known signal waveform, which modulates the light output by the light source, and the sensed light signal.

21. The electronic device of claim 19, wherein the light source comprises a laser diode.

* * * * *